US012176125B2

(12) United States Patent
Yin

(10) Patent No.: US 12,176,125 B2
(45) Date of Patent: *Dec. 24, 2024

(54) METHOD OF MAKING AN INSULATED CONDUCTIVE COMPONENT

(71) Applicant: GE Aviation Systems LLC, Grand Rapids, MI (US)

(72) Inventor: Weijun Yin, Niskayuna, NY (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 1197 days.

This patent is subject to a terminal disclaimer.

(21) Appl. No.: 16/929,571

(22) Filed: Jul. 15, 2020

(65) Prior Publication Data

US 2022/0020511 A1 Jan. 20, 2022

(51) Int. Cl.
*H01B 13/16* (2006.01)
*B05D 1/18* (2006.01)
(Continued)

(52) U.S. Cl.
CPC ............ *H01B 13/16* (2013.01); *B05D 1/185* (2013.01); *B05D 3/067* (2013.01); *B05D 3/068* (2013.01);
(Continued)

(58) Field of Classification Search
CPC .. H01B 13/16; H01B 13/003; H01B 13/0036; B05D 1/185; B05D 3/067; B05D 3/068; C25D 13/02; C25D 13/12; C25D 13/20; C25D 13/22; H02K 1/04; H02K 3/30; H02K 3/345; H02K 15/12; H02K 15/10; C09D 5/448; C09D 201/00; C09D 7/61; C08K 3/04; C08K 2003/282; C08K 2201/016; C08K 2003/2227; C08K 3/013; C08K 2003/385; C08K 2201/001; C04B 37/025; C04B 37/001; C04B 2235/787; C04B 2237/402; C04B 2237/083; C04B 2235/9653; C04B 2235/775; C04B 2237/32; C04B 2235/5296; B32B 15/00; B32B 10/00; Y10T 428/252; Y10T 428/24802; Y10T 428/12458; Y10T 428/24992
See application file for complete search history.

(56) References Cited

U.S. PATENT DOCUMENTS 6,046,507 A 4/2000 Hatchard et al.
6,864,110 B2 3/2005 Summers et al.
(Continued)

FOREIGN PATENT DOCUMENTS

CN 105764969 A 7/2016
CN 110556985 A 12/2019

*Primary Examiner* — Xiuyu Tai
(74) *Attorney, Agent, or Firm* — McGarry Bair PC

(57) ABSTRACT

A method of manufacturing an insulated conductive component having an electrically conductive element is provided. The method includes applying a first layer of a first material comprising a thermally conductive ceramic on a portion of the conductive element, and applying a second layer of a second material comprising a polymeric resin over the first layer. The method includes curing the conductive element to infuse the second material into the first material to define an electrically insulative, thermally conductive coating on the portion of the electrically conductive element.

20 Claims, 7 Drawing Sheets

(51) Int. Cl.
*B05D 3/06* (2006.01)
*C25D 13/02* (2006.01)
*H01B 13/00* (2006.01)

(52) U.S. Cl.
CPC ........... *C25D 13/02* (2013.01); *H01B 13/003* (2013.01); *H01B 13/0036* (2013.01)

(56) References Cited

U.S. PATENT DOCUMENTS

| | | | |
|---|---|---|---|
| 6,887,361 | B1 | 5/2005 | Visco et al. |
| 7,538,045 | B2 | 5/2009 | Bhatia et al. |
| 9,290,855 | B2 | 3/2016 | Worsley et al. |
| 9,303,327 | B2 | 4/2016 | Yeong et al. |
| 10,407,792 | B2 | 9/2019 | Rose et al. |
| 2012/0141777 | A1 * | 6/2012 | Idemoto .............. C23C 18/1208 204/488 |
| 2014/0076613 | A1 | 3/2014 | Mahler et al. |
| 2017/0011820 | A1 * | 1/2017 | Yin .......................... H01B 3/12 |
| 2017/0338037 | A1 | 11/2017 | Katzir et al. |
| 2018/0233981 | A1 * | 8/2018 | Yin ........................ H02K 3/345 |
| 2019/0372441 | A1 | 12/2019 | Yin et al. |

* cited by examiner

METHOD OF MAKING AN INSULATED CONDUCTIVE COMPONENT

STATEMENT REGARDING FEDERALLY SPONSORED RESEARCH OR DEVELOPMENT

This invention was made with government support under Contract No. DE-EE0007629 awarded by the Department of Energy. The government has certain rights in the invention.

TECHNICAL FIELD

This disclosure relates to insulated, conductive electrical devices, and more specifically, to a method of manufacturing a conductive component having an electrically insulating, thermally conductive coating.

BACKGROUND

Certain electric devices employ conductors such as busbars and other electrically conductive elements to supply or distribute electrical power to or within the electric device. In many situations, electrical insulation is applied to the conductive elements to prevent to prevent current leakage or electric shock, for example. The electrical insulation can be applied as a wrapping, film, coating, etc. For example, electrical insulation, such as polymer films, Kapton tape, and insulation papers can be used to provide the electrical insulation especially between two adjacent conductors in the electric device. Materials with good dielectric properties often exhibit poor thermal conductivity, which hinders heat dissipation from the conductor. This poor heat dissipation can result in an undesired reduction in power efficiency and/or power density of the device.

BRIEF DESCRIPTION

In one aspect, the present disclosure relates to a method of manufacturing an insulated conductive component having an electrically conductive element. The method includes applying a first material comprising a thermally conductive ceramic material on at least a portion of the electrically conductive element to form a first layer, applying a second material comprising a polymeric resin onto at least a portion of second material to define a second layer, and curing the conductive element to infuse the second material into the first material to define an electrically insulative, thermally conductive coating on the portion of the electrically conductive element.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
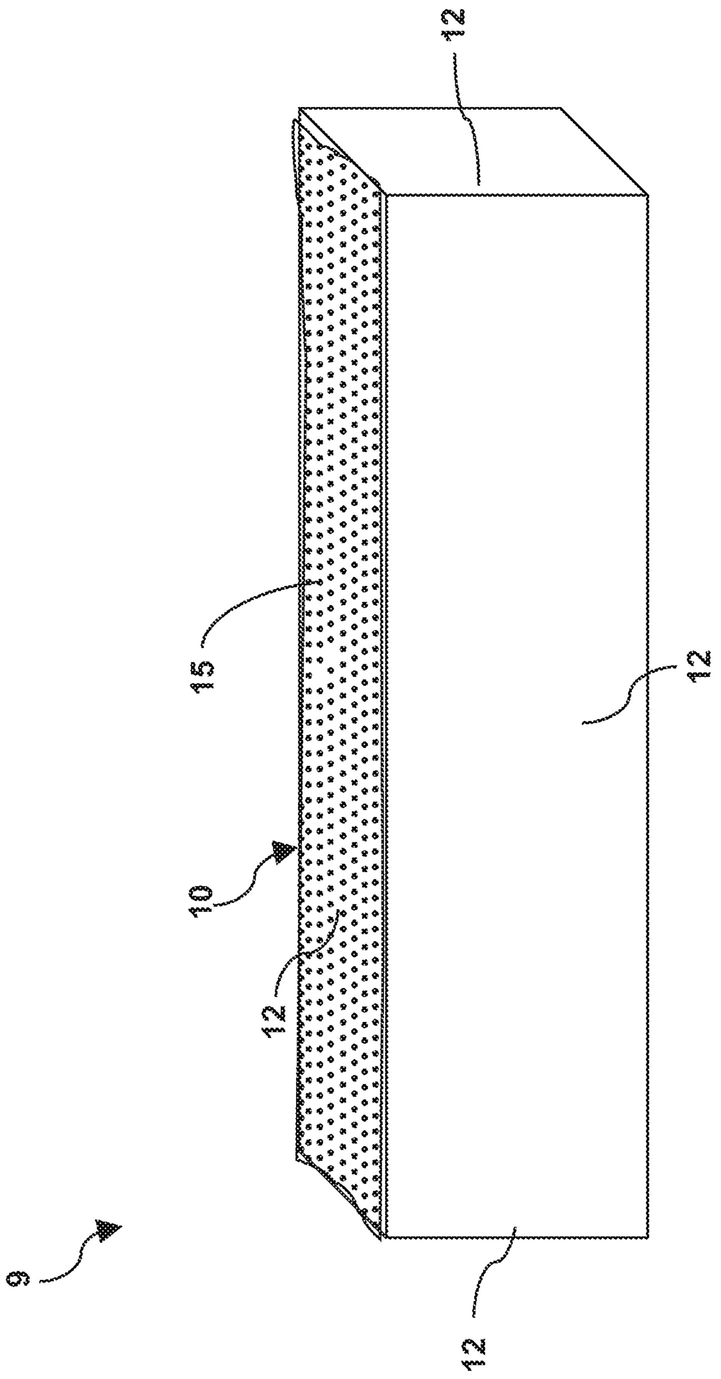
FIG. 1 illustrates a perspective schematic view of a conductive component with a conductive element having an electrically insulating, thermally conductive coating in accordance with various aspects described herein.

Aspects of the disclosure can be implemented in any environment, apparatus, or method for a coating on a substrate regardless of the function performed by the substrate.

As used herein, the term "set" or a "set" of elements can be any number of elements, including only one. All directional references (e.g., radial, axial, upper, lower, upward, downward, left, right, lateral, front, back, top, bottom, above, below, vertical, horizontal,) are only used for identification purposes to aid the reader's understanding of the disclosure, and do not create limitations, particularly as to the position, orientation, or use thereof. The exemplary drawings are for purposes of illustration only and the dimensions, positions, order and relative sizes reflected in the drawings attached hereto can vary. As used herein, the term "about" is intended to mean that the values indicated are not exact and the actual value can vary from those indicated in a manner that does not materially alter the operation concerned. For example, the term "about" as used herein is intended to convey a suitable value that is within a particular tolerance (e.g., ±10%, ±5%, ±1%), as would be understood by one of ordinary skill in the art.

Insulative coatings are used to insulate electrical conductors in electric machines, and devices. The term "insulative coating", as used herein, refers to a coating that is both electrically insulative and thermally conductive. Insulative coatings generally exhibit a low electrical conductivity (for example, less than about $10^{-8}$ siemens per meter (S/m)) and a high thermal conductivity (for example, greater than about 1 watt per meter-Kelvin (W/mK).

In some conventional approaches, insulative coatings comprising ceramic materials in a polymer resin are applied by powder coating or by application techniques, such as brushing, or rolling techniques. In other approaches, pure ceramic coatings in a polymer matrix having desired thermal conductivity and dielectric strength can be applied by chemical vapor deposition ("CVD"), thermal spray, or by electrophoretic deposition ("EPD"). However, when coating with ceramic materials, high sintering temperatures (e.g., greater than 1000 degrees Celsius) are often additionally applied to form substantially void free coatings. Such high sintering temperatures can degrade the properties of the coated object (i.e., the conductor). Furthermore, these coatings often suffer from cracking, especially under thermal cycling, which can allow the coated conductor to electrically short to adjacent conductors in certain instances.

For example, prior coatings would often exhibit a relatively low coefficient of thermal expansion ("CTE"), or relative expansion per unit change in temperature, particularly when compared to typical conductive substrates, which would often have a relatively high CTE. When applied to such conductive substrates having a relatively higher CTE, the prior ceramic coatings would be prone to undesired cracking or mechanical breakdown in response to stresses resulting from different thermal expansion characteristics of the coating relative the substrate during the alternating conductive heating and cooling cycles during normal operation. In some cases, the mechanical breakdown would be manifested in the form of a partial discharge or corona at an undesirably low voltage.

For ease of description and understanding, as used herein the term "coefficient of thermal expansion" (CTE) refers generally to a relative increase or decrease in at least one physical dimension (e.g., shape, area, volume, etc.) with respect to a change in temperature of an object. For the ease of description, the CTE will be discussed herein with respect to a linear change in length of an object, but it will be appreciated that the term is not so limited and can apply more broadly to other dimensions including, for example, area or volume. Also, as used herein, the term Young modulus refers to a mechanical property indicative of the stiffness of a solid material. It defines the relationship between stress (force per unit area) and strain (proportional deformation) in a material in the linear elasticity regime of a uniaxial deformation.

As described herein, aspects are directed to a conductive component (for example, a bus bar) having an insulative coating. The insulative coating comprises a first material and a second material sequentially applied to a surface of a conductive element and then cured to define a monolithic insulative coating that is both thermally conductive and electrically insulating. In some aspects, the insulative coating can be a conformal coating deposited onto at least a selected portion of the conductive element to electrically isolate the conductive element. A desired thermal conductivity of the first material can be achieved by incorporating thermally conductive ceramic materials. The thermally conductive ceramic materials can be uniformly distributed or densely packed to form highly connected thermal conducting paths. Moreover, as will be described in more detail herein, thermal and thermal cycling induced cracks and voids in the insulative coating can be reduced or eliminated by additionally subsequently depositing the second material such as a silicon resin or epoxy over the first material. The second material can be selected based on its inherent properties (such as CTE) relative to the corresponding inherent properties of the conductive element and the first material. Additionally, the relative amount or volume of the first and second materials can be varied to attain a desired property (such as a CTE) After the first and second materials are applied, the conductive element is heat treated or cured to infuse the second material into the first material and define the insulative coating. As such, the disclosed insulative coating process and materials enable use of the conductive element in the manufacture of electric machines with improved performance.

For example, FIG. 1 is a perspective view of a non-limiting aspect of a conductive component 9 comprising a conductive element 10 (for example, a bus bar) having an insulative coating 15 applied thereon. The term "conductive component", as used herein, refers to a component comprising one or more electrically conductive elements (for example, an assembly) comprising a conductive material which is operative to conduct electric current or to produce magnetic flux in response to electric current. The conductive element 10 can be made of any electrically conductive material. Some non-limiting examples of such electrically conductive materials can include copper, aluminum, and steel.

While the conductive element 10 in FIG. 1 is shown and discussed, for ease of description and understanding, as having the form of a simple, generally elongate rectangular conductor, it will be appreciated that in various contemplated aspects, the conductive element 10 can have any desired geometric shape or size, and can have a simple, complex, or amorphous structure for any desired application. Additionally, it will be appreciated that while the conductive element 10 is depicted as a geometrically simple conductor, other aspects are not so limited and can comprise any conductive element of an electric machine, and the techniques discussed herein are applicable to other conductors and electric machines or devices. The conductive element 10 can comprise a set of surfaces 12. In some aspects, the set of surfaces 12 can comprise only one surface 12. In other aspects the set of surfaces 12 can comprise any desired number of surfaces 12 without departing from the scope of the disclosure herein. In aspects, an insulative coating 15, which is illustrated with dots, can be applied to at least a portion of at least one surface 12 of the conductive element 10.

With reference to FIGS. 2A-2D, a general description of an aspect of a sequential process to form the insulative coating 15 is shown. FIGS. 2A-2D illustrate a variant of the conductive element 10, therefore, like parts in the variant will be identified with the same reference number as FIG. 1, but increased by 100. The conductive element 110 of FIGS. 2A-2D has a generally cylindrical shape with circular cross-section, and is depicted in an axial end view orientation (in contrast to the cuboid with a rectangular shape of conductive element 10). FIGS. 2A-2D sequentially depict non-limiting aspects of the conductive element 110 comprising a surface 112, with each of FIGS. 2A-2D illustrating a progressive step in the formation of the coated conductive element 110 having an insulative coating 15, starting with a conductive element 110 in FIG. 2A and ending with a conductive element 10 having an insulative coating 15 in FIG. 2D. As depicted in FIGS. 2A-2D, the insulative coating 15 can comprise a first material 17 (for example, a ceramic material) applied as a first layer 18, and a second material 19 (for example a polymeric thermoset resin) applied as a second layer 20, which are then thermally cured to define the insulative coating 15.

Figure 2A:
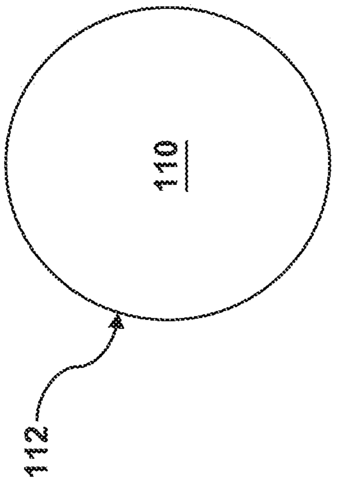
FIG. 2A illustrates an end view in cross-section of another conductive element without a coating in accordance with various aspects described herein.
Figure 2B:
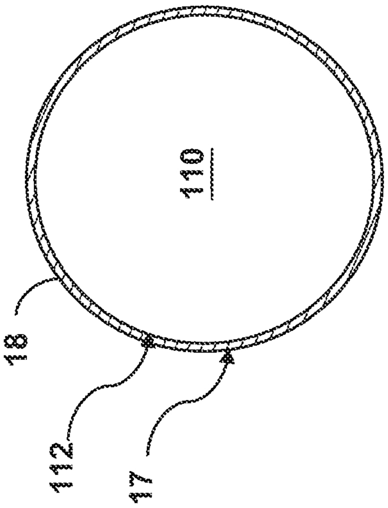
FIG. 2B illustrates the conductive element of FIG. 2A with an electrically insulating, thermally conductive first layer deposited thereon in accordance with various aspects described herein.

In FIG. 2A, an aspect of the conductive element 110 is shown in a cross-sectional end view in an un-coated state. As depicted in the aspect of FIG. 2B, a first layer 18 is shown applied to the surface 112 of conductive element 110. The first layer 18 can be continuous or discontinuous. It can have a constant or varying thickness. The manner of application is not germane to the method, but one possible method of application is by an EPD coating process. As depicted, the first layer 18 covers the entire circumferential surface 112 of the conductive element 110. However, it is contemplated that in other aspects, predetermined portions of the surface 112 can be uncoated by the first layer 18 (for example, by selectively masking the desired uncoated portions of the surface 112 prior to the coating process). In yet other aspects, for example, for the conductive element 110 having a set of surfaces 112, the first material 17 can be applied to only some, or alternatively to each, surface of the set of surfaces 112.

Figure 2C:
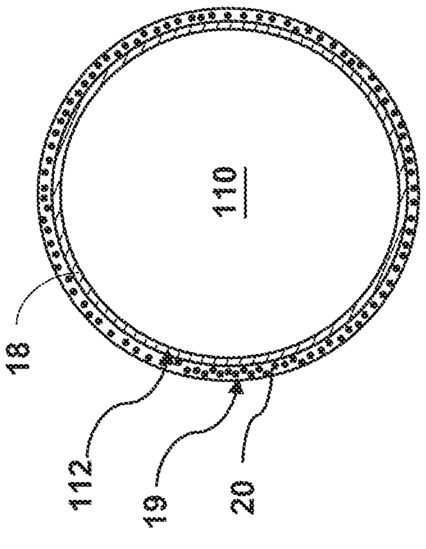
FIG. 2C illustrates the example conductive element of FIG. 2B with a polymeric thermoset resin second layer deposited thereon in accordance with various aspects described herein.

As depicted in the aspect of FIG. 2C, a second layer 20 comprising the second material 19 can be applied onto the first layer 18 previously deposited on the surface 112 of the conductive element 110. As depicted, the second layer 20 covers the entire first layer 18. However, it is contemplated that in other aspects, portions of the surface 112, or portions of the first layer 18, can be left uncoated by the second layer 20 (for example, by masking the desired uncoated portions prior to the application of the second layer 20). The manner in which the second layer is applied is not germane to the method. Any suitable method, such as dip coating, could be used.

Figure 2D:
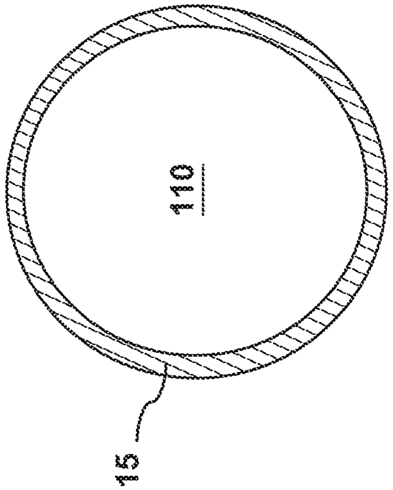
FIG. 2D illustrates the example conductive element of FIG. 2C having an electrically insulating, thermally conductive coating after curing in accordance with various aspects described herein.

As depicted in FIG. 2D, the conductive element 110 with the first and second layers 18, 20 can then be cured, such as by heat-treating at an elevated temperature for a predetermined period. As heat is applied, the viscosity of the first and second layers 18, 20 initially drops (i.e., before the onset of cross-linking) thereby causing the second material 19 to penetrate and/or infuse the first material 17 to thereby define the insulative coating 15 on the coated portion of the conductive element 110. As will be understood, curing of the first and second materials can comprise any conventional curing process to elevate the temperature of the first layer 18 and second layer 20 and harden the material therein (for example, by cross-linking of polymer chains). The curing can be initiated using any desired conventional method such as heat, radiation, electron beams, or chemical additives. In an aspect, the insulative coating 15 can be a conformal insulative coating 15. In other aspects, the insulative coating 15 can define a homogenous structure.

As will be discussed in more detail herein, in various aspects, the first material 17 and second material 19 can be selected based on intrinsic properties such as their respective CTE. In an aspect, the first material 17 and second material 19 can be selected at least in part based on their respective CTE relative to each other. In other aspects, the second material 19 can selected based at least in part on its CTE relative to the CTE of the conductive element material.

In aspects, the first material 17 can include a substantial amount of thermally conductive ceramic materials, such as aluminum nitride (AlN), boron nitride (BN), aluminum oxide ($Al_2O_3$), or a combination thereof. In certain aspects, the concentration of the thermally conductive ceramic materials can be greater than about 60% by volume. In certain aspects, the concentration of the thermally conductive ceramic materials can be between about 30% and about 60% by volume. In certain aspects, the concentration of the thermally conductive ceramic materials having a high aspect ratio (e.g., nanowire, nanotube, nanofiber) can be less than about 30% by volume. In certain aspects, the concentration of the thermally conductive ceramic materials having a high aspect ratio (e.g., nanowire, nanotube, nanofiber) and/or have good alignment can be less than about 6% by volume. In certain aspects, the thermal conductivity of the first layer 18 can be greater than about 3 W/mK. The high thermal conductivity can be achieved based at least in part on the distribution, packing, and/or content of the thermally conductive ceramic materials within the first material 17. The thermally conductive ceramic materials can have a long-range connectivity that forms long-range thermal conducting paths to ensure that the thermal conductivity of the coating 15 is substantially high.

Figure 3:
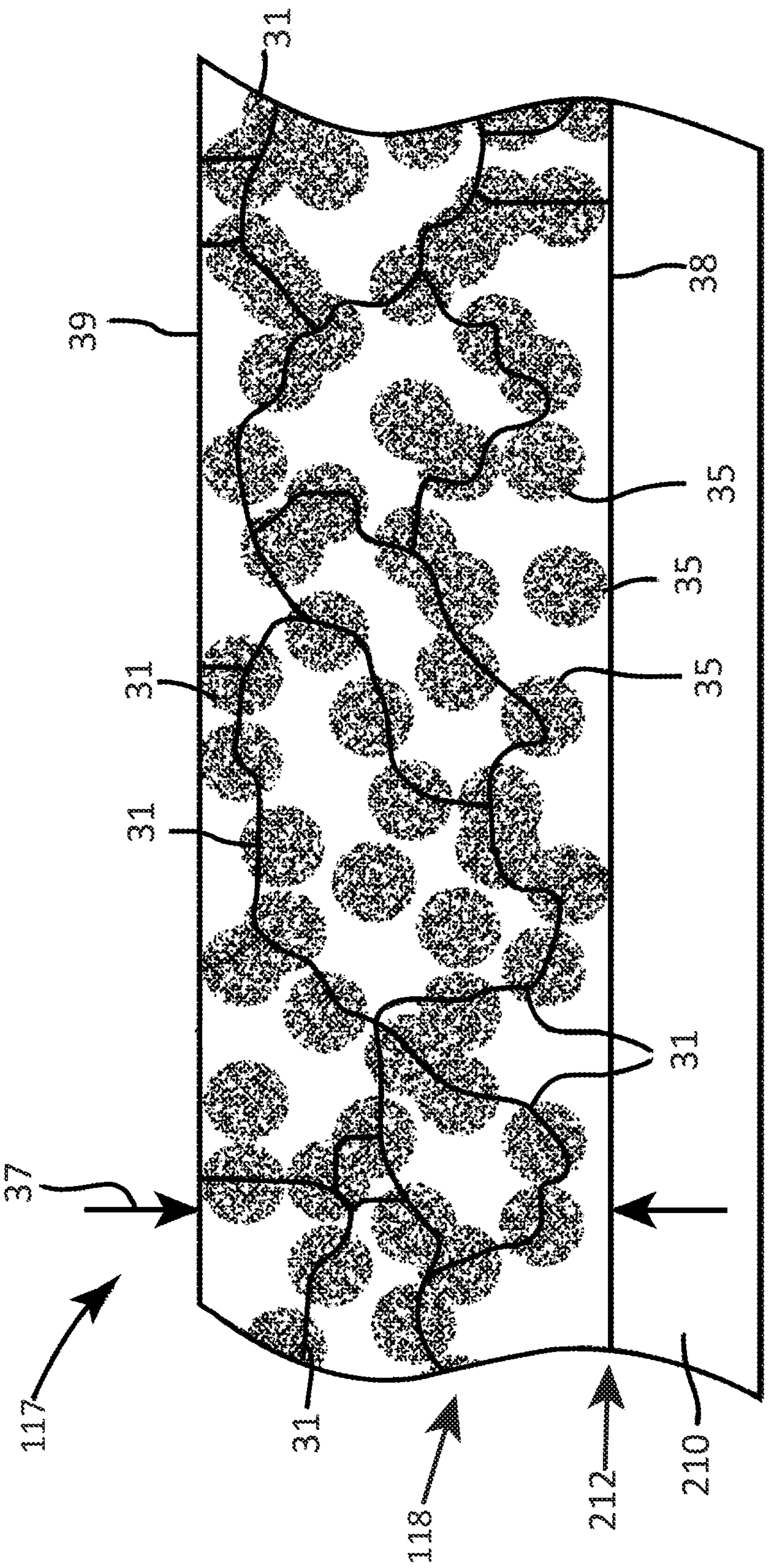
FIG. 3 is a schematic illustrating an aspect of the electrically insulating, thermally conductive first layer having thermal conducting paths in accordance with various aspects described herein.

With reference to FIG. 3, an aspect of the first layer 18 having thermal conducting paths 31 is shown in cross-section. FIG. 3 illustrates a variant of the conductive element 110, therefore, like parts in the variant will be identified with the same reference number as FIG. 2B, but increased by 100. In the illustrated non-limiting aspect, the first material 117 is shown forming a continuous first layer 118 on the surface 212 of the conductive element 210. The first layer 118 can include a first bottom edge 38 defined along the surface 212 of the conductive element 210, and a first top edge 39 opposite and spaced from the first bottom edge 38. The first layer 18 defines a first thickness 37 between the first bottom edge 38 and first top edge 39.

The thermally conductive ceramic materials within the first material 17 can be in the form of thermally conductive ceramic particles 35 (e.g., aluminum nitride particles, boron nitride particles, aluminum oxide particles, diamond particles, or a combination thereof). As illustrated, the thermally conductive ceramic particles 35 are packed adjacent to one another at a predetermined concentration to form thermal conducting paths 31 that extend between the first bottom edge 38 and the first top edge 39, across the first thickness 37 of the first layer 18 of the first material 17. Additionally, in certain aspects, these thermal conducting paths 31 can also run laterally through the first layer 118. It is presently recognized that, in general, the thermal conducting paths 31 enable the first layer 118 to maintain a thermal conductivity close to that of the thermally conductive ceramic particles 35 themselves. The thermal conducting paths 31 of the thermally conductive ceramic particles 35 can be tuned by changing the particle size, distribution, or concentration to achieve thermal conductivity greater than about 3 W/mK.

As another non-limiting example, the thermally conductive ceramic materials can also be in the form of an electrically nonconductive nanotube, nanofiber, or nanowire, having a high aspect ratio (e.g., greater than about 500:1, about 400:1, about 300:1, about 200:1, about 100:1, about 50:1).

Figure 4:
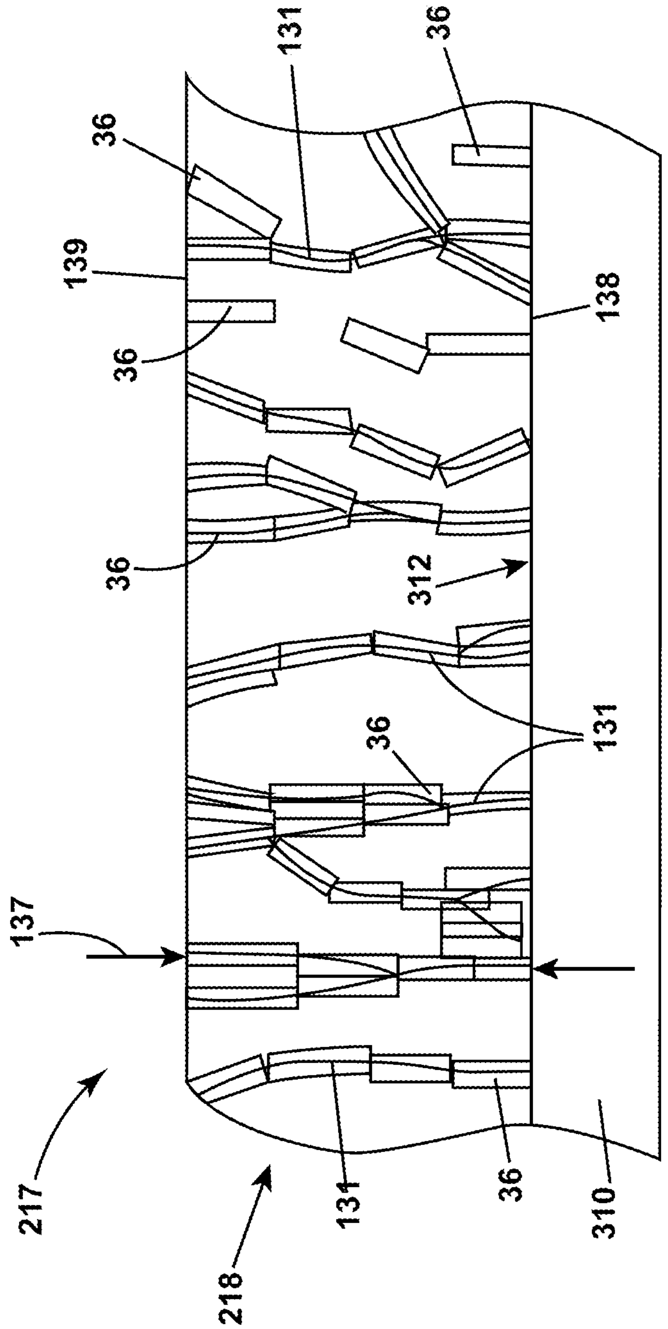
FIG. 4 is a schematic illustrating another aspect of the electrically insulating, thermally conductive first layer having thermal conducting paths in accordance with various aspects described herein.

FIG. 4 illustrates a variant of the conductive element 210 and first layer 118, shown in FIG. 3, therefore, like parts in the variant will be identified with the same reference number as FIG. 3, but increased by 100. FIG. 4 shows a schematic cross section illustrating a non-limiting aspect of the first layer 218 of the first material 217 having a predetermined amount of high-aspect thermally conductive ceramic particles, such that thermally conducting paths 131 are formed across the thickness of the first layer 218. The thermally conductive ceramic particles comprise thermally conductive ceramic nanotubes 36 (e.g., aluminum nitride nanotubes, boron nitride nanotubes, aluminum oxide nanotubes, or a combination thereof) dispersed in the first layer 218.

In the illustrated aspect, the first material 217 is shown as a continuous first layer 218 on the surface 312 of the conductive element 310. The first layer 218 extends between the first bottom edge 138 nearest the surface 312 of the conductive element 310, and the first top edge 139 opposing and spaced from the first bottom edge 138 and extends laterally along the surface 312. The first layer 218 defines a first thickness 137 between the first bottom edge 138 and first top edge 139.

For the illustrated portion of the first layer 218, the thermally conductive ceramic nanotubes 36 are aligned to generally extend between the upper and lower surfaces 139, 138. Due to the alignment of the thermally conductive ceramic nanotubes 36, the thermal conducting paths 131 can be formed more effectively extending between the first bottom edge 138 and first top edge 139 across the first thickness 137. In certain aspects, a predetermined concentration of the high-aspect articles can be between about 6% and about 60% by volume. It will be appreciated that the amount of the thermally conductive ceramic materials incorporated in the first material 217 can depend at least in part of the aspect ratios and/or the alignment of the thermally conductive ceramic materials.

The first material 217 deposited on conductive element 310 can be substantially continuous and substantially uniform (e.g., uniform in terms of composition, thickness, etc.). The dielectric breakdown strength of the first layer 218 can be affected by the first material 217 coating thickness and/or uniformity, which can be controlled by the deposition kinetics and deposition rate. The dielectric breakdown strength can be increased by increasing the first layer 218 thickness and/or uniformity and the filling quality of the second material 119. In certain aspects, the first layer 218 can have a thickness in a range of about 0.25 millimeters (mm) to about 0.5 mm. In certain aspects, the first layer 218 can have a thickness in a range of about 0.025 mm to about 0.25 mm. In certain aspects, the first layer 218 can have a thickness in a range of about 0.025 millimeters (mm) to about 0.5 mm. The first layer 218 can be substantially conformal, meaning it is continuous and conforms to the contours (e.g., surface features, including troughs, channels, edges, corners, and surface irregularities) of the surface 312 conductive element 310.

Figure 5:
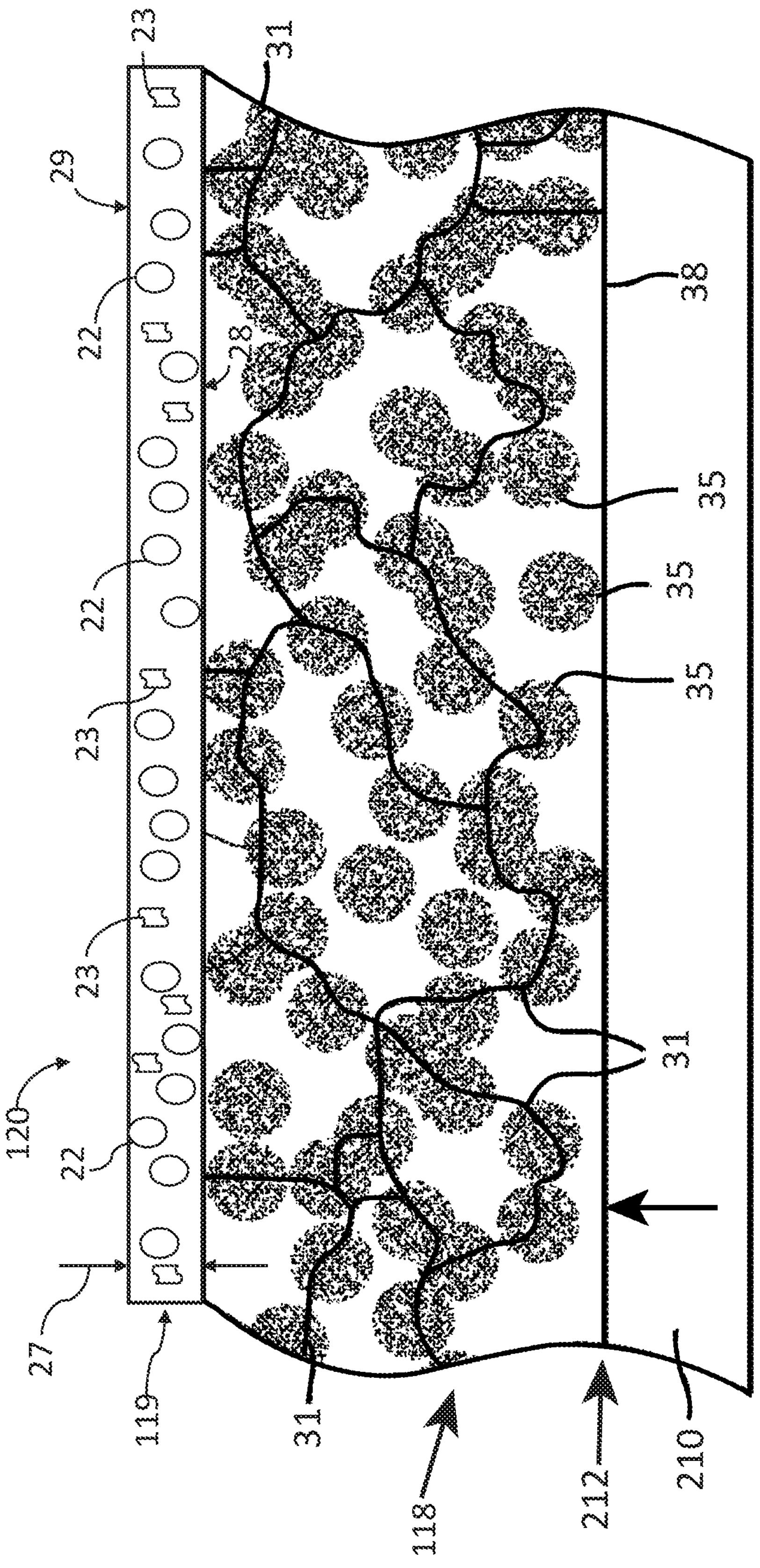
FIG. 5 is a schematic illustrating an aspect of the electrically insulating, thermally conductive first layer of FIG. 3, with a polymeric thermoset resin second layer deposited thereon, in accordance with various aspects as described herein.

FIG. 5 is the same as FIG. 3, with an additional layer (i.e., second layer 120) deposited on the first layer 118. The schematic depiction illustrated in FIG. 5 is like the conductive element illustrated in FIG. 4, therefore, like parts will be identified with like numerals, with it being understood that the description of the like parts of the first layer 118 depicted in FIG. 3 applies to FIG. 5, unless otherwise noted.

In the illustrated aspect, the second material 119 is shown deposited as a continuous second layer 120 extending laterally along the first top edge 39 of the first layer 118. In aspects, the second material 119 can fills any empty spaces between defined by portions of the first material 117 and/or on the surface of first material 117. The second layer includes a second bottom edge 28 extending along the first top edge 39 of the first layer 18, and a second top edge 29, opposite and spaced from the second bottom edge. The second layer 120 defines a second thickness 27 between the second bottom edge 28 and second top edge 29. As shown, the second layer 20 can have any a second thickness 27 having any desired dimension.

In non-limiting aspects, the second material 119 forming the second layer 120 can comprise a thermoset polymer resin or an epoxy comprising polymers 22 (e.g., liquid crystal polymers, thermal plastics, organic monomers or oligomers, or a combination thereof) arranged in a matrix. In some non-limiting aspects, the second material 119 can comprise silicone resin. In still other non-limiting aspects the second material 119 can comprise a thermoset polymer, such as a polyamide-imide. For example, in some aspects, the second material 119 can comprise a high-temperature silicone resin, such as Dowsil™ RSN-0805 resin, or Dowsil™ RSN-0808 resin manufactured by Dow Corporation, or SILRES® H62 C manufactured by Wacker Chemical Corporation. Alternatively, in other non-limiting aspects, the second material 119 can comprise a high-temperature epoxy such as Astrol 3391 manufactured by Astro Chemical Company. In still other non-limiting aspects, the second material can comprise a maleimide terminated stress-free (SF) resin, such as SFR-2300MR-HBP manufactured by Hitachi Chemical Company, Ltd.

In some aspects, the second material 119 used to form the second layer 120 can additionally comprise a reactive element 23 as a curing agent. For example, the reactive agent can comprise an amine monomer. In other non-limiting aspects, the reactive agent can comprise a hydroxyl monomer.

In non-limiting aspects, the second layer 120 can be applied over the first layer 118 using any number of conventional techniques. For example, in an aspect a conventional vacuum pressure impregnation (V.P.I) process can be used to apply the second layer 20.

Regardless of the deposition technique used to deposit the second material 119, once the second layer 120 is applied over the first layer 118, the conductive element 210 with the first layer 118 and second layer 120 deposited thereon can be subjected to thermal processing, such as by a high temperature curing.

Figure 6:
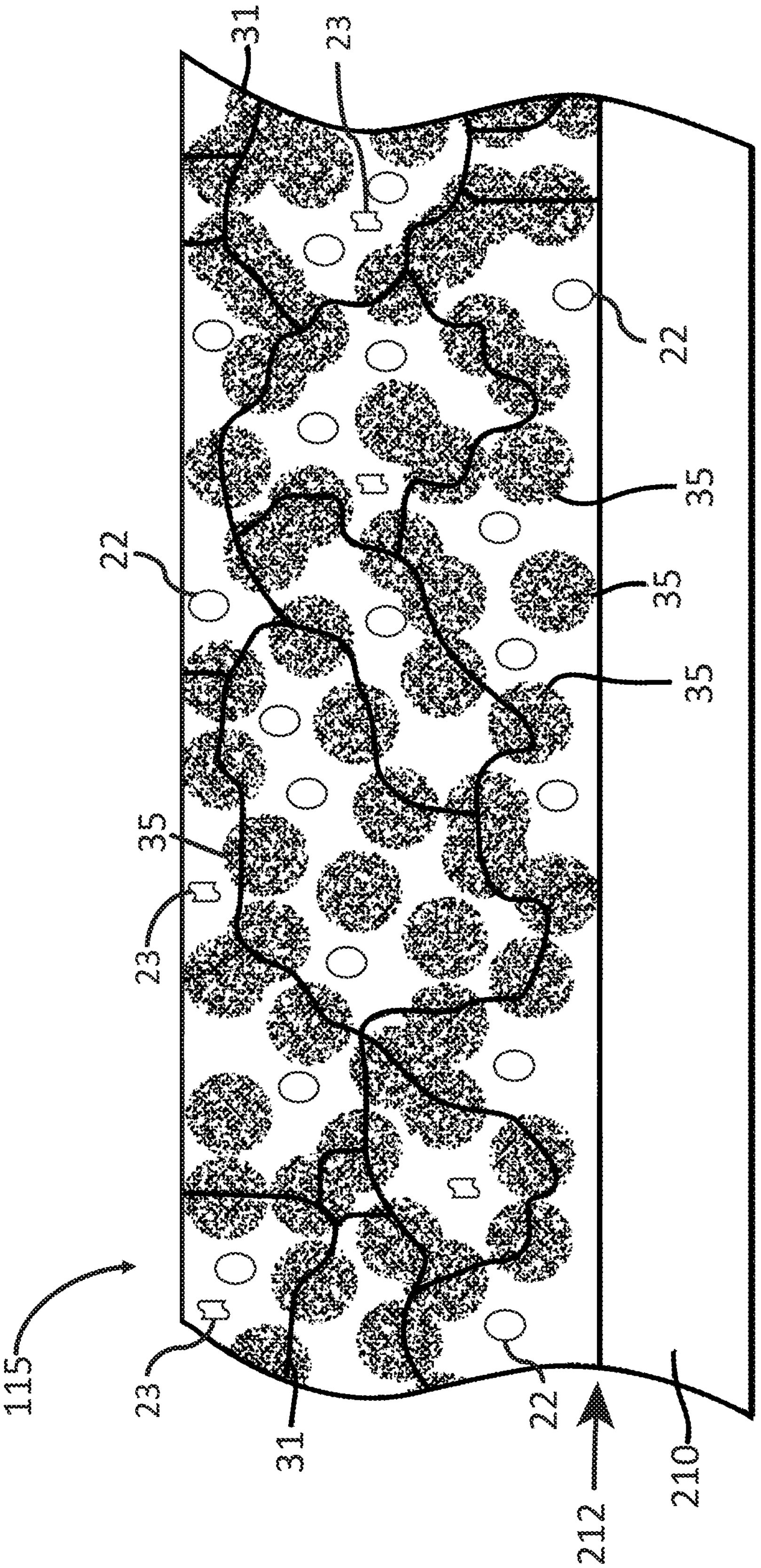
FIG. 6 is a schematic illustrating the aspect of FIG. 5, after a curing process, in accordance with various aspects as described herein.

FIG. 6 depicts the aspect of FIG. 5, after high temperature curing. The schematic depiction illustrated in FIG. 6 is like the conductive element illustrated in FIG. 5, therefore, like parts will be identified with like numerals, with it being understood that the description of the like parts depicted in FIG. 5 applies to FIG. 6, unless otherwise noted.

By exposing the conductive element 210 to elevated temperatures during the curing, deposited second material 119 can be assimilated into and/or throughout the first material 117. In an aspect, the elevated temperature curing infuses the second material 119 into the first material 117 and thereby secures or arranges the thermally conductive ceramic of the first material 117 and the resin of the second material 119 within a polymer matrix to define the insulative coating 115 on the coated portion of the conductive element 210. In aspects, the infusing of the second layer 120 into the first layer 118 thereby forms a monolithic and homogenous structure defining the insulative coating 115. In an aspect, the coating 115 can be a conformal coating 115.

In non-limiting aspects, the high temperature curing can be accomplished by baking the conductive element 210 in an oven at a predetermined temperature. In other aspects, the thermal processing can be done by elevating the temperature of the conductive element 210 by applying an electrical current through it, and relying on resistance heating of the conductive element 210 to generate heat.

As noted above, in prior art insulative coating techniques, post-deposition processing, (such as heat treating or thermal curing) of ceramic coatings would often lead to undesired voids within, or cracking of, the ceramic coating. The undesired cracking of the ceramic coating would often occur after cooling from post-application heat curing, or in-service heat cycling, due to internal strain caused at least in part by to differing CTEs of the substrate and the coating. For example, the strain on a given coating on a given substrate over a thermal cycle (i.e., change in temperature) can be determined from the equation: $\sigma=E\alpha(T-To)=E\Delta\alpha\Delta T$, where "E" is the Young modulus of the coating material; "$\Delta\alpha$" is CTE difference between the substrate material and the coating material; and "$\Delta T$" is the temperature difference in the thermal cycle. Thus, will be appreciated that when the Young modulus of the coating is lowered, thereby reducing the difference between the Young modulus of the coating and the substrate, the thermal cycling stress on the coating 15 can be reduced. It will likewise be appreciated that as a relative CTE difference between the substrate and the coating is lowered, the thermal cycling stress will likewise be reduced.

For example, in non-limiting aspects, the conductive element 210 can comprise a conductive material such as copper (Cu), having a CTE of approximately 16 parts per million per degree Celsius (ppm/C). In other non-limiting aspects, the conductive element 10 can comprise a conductive material such as aluminum (Al), having a CTE of approximately 23 ppm/C. In still other non-limiting aspects, the conductive element 210 can comprise a conductive material such as carbon steel having a CTE of approximately 11 ppm/C. In aspects, the first material 117 can comprise various ceramics having respective CTEs in the range of 2 ppm/C to 11 ppm/C. It has been found that by selecting the second material 119 having a higher CTE than that of the conductive element 210, and impregnating the second layer 120 comprising a predetermined amount of the second material 119 into the first layer 118 of the first material 117 to define an insulative coating 115 as disclosed herein, the coating 115 can advantageously have a CTE that more closely matches the CTE of the conductive element 210, thereby reducing stress on the insulative coating 115 during subsequent heating cycles.

Additionally, the CTE of the insulative coating 115 can also be further modified or tuned based on a using a predetermined amount (e.g., volume) of the second material 119, relative to the amount (e.g., volume) of the first material 117. That is, the volumetric ratio of the second material 119 to the first material 117 in the insulative coating 115 can be pre-selected to result in a predetermined or desired CTE of the insulative coating 115 after curing. For example, by applying an amount of the second material 119 that is a predetermined percentage by volume of the amount of the first material 117 applied to the surface 212 of the conductive element 210, a desired CTE of the cured insulative coating 115 can be attained.

In a non-limiting aspect, the conductive element 210 can comprise copper having a CTE of about 16 ppm/C. In such aspects, and a first layer 118 can comprise, by way of a non-limiting example, the first material 117 comprising a ceramic selected from the group consisting of Boron Nitride (BN), Silicon Nitride (SiN), Aluminum Nitride (AlN), Silica, aluminum silicate and Alumina resulting in a CTE for the first layer 18 of about 2 ppm/C, 2.8 ppm/C, 5 ppm/C, 5.6 ppm/C, and 7.2 ppm/C, respectively. Additionally, in such aspects, and by way of another non-limiting example, the second layer 120 can comprise a second material 119 comprising a volume between about 33% to about 66% of the volume of the first material 117 forming the first layer 118, and selected from the group consisting of a maleimide terminated SF resin, a polyamide-imide, an epoxy, and a silicone, having a CTE of about 60 ppm/C, 55 ppm/C, 60 ppm/C, and 150 ppm/C, respectively. In such aspects, it has been found the insulative coating 115 can have a CTE of about 10.5-11 ppm/C after curing.

By way of a non-limiting illustration, Table 1 provides examples of the measured CTE values for a set of three samples of insulative coating 115 having 60% by volume of a first material 117 deposited as a first layer 118. Each sample included a first layer 118 comprising AlN with a CTE value of about 2.5 ppm/C. As shown, a first sample (designated Sample 1) of the insulative coating 115 was fabricated having 40% by volume of the second material 119 deposited as a second layer 120 comprising a SF resin with a CTE value of about 60 ppm/C, over the first layer 118, and resulted in an insulative coating 115 having a CTE of about 22 ppm/C after curing. Similarly, a second sample (designated Sample 2) of the coating 115 was fabricated having 40% by volume of the second material 119 deposited as a second layer 120 comprising an epoxy with a CTE value of about 60 ppm/C, over the first layer 118, and resulted in a coating 115 having a CTE of about 11 ppm/C after curing. Lastly, a third sample (designated Sample 3) of the coating 115 was fabricated having 40% by volume of the second material 119 comprising a polyamide-imide with a CTE value of about 55 ppm/C, and resulted in a coating 115 after curing having a CTE of about 10.5 ppm/C. In each case, the sample insulative coating 115 exhibited a relative CTE between the CTE of first material and the CTE of the second material.

TABLE 1

CTE (ppm/C) values of sample insulative coatings 15

| First Material (60% by Vol.) | Second material (40% by Vol.) SF resin (60 ppm/C) Sample 1 | Epoxy (60 ppm/C) Sample 2 | Polyamide-imide (55 ppm/C) Sample 3 |
|---|---|---|---|
| AlN (2.5 ppm/C) | 22 | 11 | 10.5 |

TABLE 2

Difference between Sample coating CTE and substrate CTE

| Substrate (CTE): | Coating: (CTE) AlN only (2.5 ppm/C) | Sample 1 (22 ppm/C) | Sample (11 ppm/C) | Sample 3 (10.5 ppm/C) |
|---|---|---|---|---|
| Copper (17 ppm/c) | 14.5 | 5 | 6 | 6.5 |
| Aluminum (23 ppm/C) | 20.5 | 1 | 12 | 12.5 |
| Steel (11 ppm/C) | 8.5 | 11 | 0 | 0.5 |

Table 2 shows a comparison of the three sample insulative coatings 115, (i.e, Samples 1-3), and a conventional ceramic coating comprising AlN alone, compared to the CTE of typical conductive substrate materials used for a substrate (e.g. conductive element 210). That is, Table 2 shows the difference between the CTE of three common conductive element 210 substrate materials (i.e., copper, aluminum, and steel), and the CTE of the insulative coatings 115 of Samples 1-3 (from Table 1) and a conventional AlN coating. It can be seen, that with one exception (i.e., the difference between the respective CTEs of Sample 1 and steel), in each case the aspects of Samples 1-3 provided an insulative coating 115 over a conductive substrate (i.e., copper, aluminum, or steel) that can exhibit reduced stress, by reducing the difference in the respective CTE value between the insulative coating 115 and the substrate or conductive element 210 as compared to a conventional ceramic coating (e.g., AlN) alone.

Thus, in various aspects, selecting the first material 117 and the second material 119 based at least in part on their respective intrinsic properties (e.g., CTE,), can reduce the difference between the CTE of the conductive element 210 and the insulative coating 115 and thereby lower the thermal stress on the insulative coating 115 while still maintaining the electrical insulative, and thermal transmissive properties of the insulative coating 115. For example, by using a second material 119 having a lower CTE than the first material 117, and heating the first layer 118 and second layer 120 to thereby cause a penetration of the second layer 120 into the first layer 118, an insulative coating 115 having a desired or improved CTE can be attained after curing.

Figure 7:
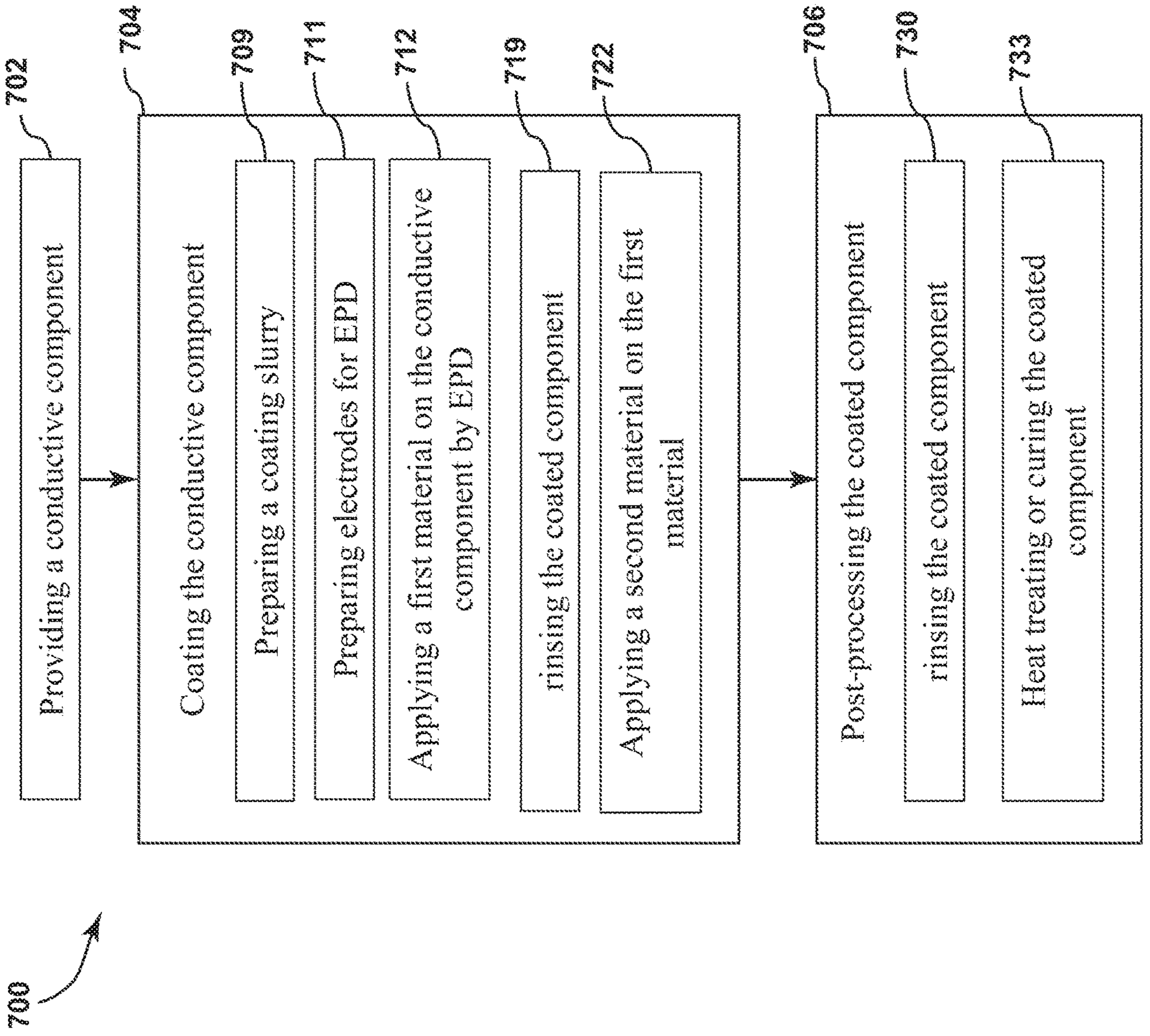
FIG. 7 is a flow diagram illustrating a process for fabricating the aspect of FIG. 6, in accordance with various aspects as described herein.

FIG. 7 is a method flow diagram illustrating a non-limiting aspect of a process 700 for fabricating a conductive element 210 (such as a busbar) having an insulative coating 115. The insulative coating 115 can comprise the first material 117 (e.g., thermally conductive and electrically insulating material) and the second material 119 (e.g., a thermoset polymer resin). In an aspect, the process 700 includes etching the surface of the conductive element 210 at step 702, rinsing the etched surface of the conductive element 210 at step 706, applying the first material 117 to the surface 212 of the conductive element 210 by EPD at 712, applying the second material 119 on the applied first material 117 at 722, then post-processing the conductive element 210 at 706 such as by a heat treating at 733.

The term, "electrophoretic deposition" (EPD), as used herein, can refer to any of electrocoating, cathodic electrodeposition, anodic electrodeposition, electrophoretic coating, or electrophoretic painting. The EPD process can involve submerging the part into a container or vessel that holds a coating slurry, (such as the first material 117 in the form of a slurry) and applying an electrical current through the EPD solution. Typically, the workpiece to be coated serves as one of the electrodes (e.g., anode or cathode), and one or more suitable counter-electrodes are used to complete the circuit. There are two principle types of EPD processes, anodic and cathodic. In the anodic EPD process, negatively charged materials in the coating slurry are deposited on a positively charged workpiece, while in the cathodic process, positively charged materials in the coating slurry are deposited on a negatively charged workpiece.

The coating application process represented by step 704 can comprise several steps, including etching the surface conductive element 210 at step 702, rinsing the etched surface of the conductive element 210 at step 706, preparing a coating slurry of the first material 117 at step 709, preparing the electrodes for deposition at step 711, and applying a first layer 118 of the first material 117 to the surface 212 of the conductive element 210 at step 712. Additionally, the coating process of step 704 includes applying a second layer 120 of the second material 119 at step 722 on the first layer 118. The second material 119 can be applied in any number of ways such as by a conventional vacuum pressure impregnation or a conventional simple coating dip.

In certain aspects, the coating slurry of the first material 117 includes a thermally conductive ceramic material. Non-limiting examples of the thermally conductive ceramic materials can include aluminum nitride, boron nitride, diamond, aluminum oxide, and other suitable electrically insulating, thermally conductive materials. The thermally conductive ceramic materials can be in any suitable forms, such as particles, nanotubes (e.g., nanotubes of single and/or multiple walls, nanotubes of different chirality), nanofibers, nanowires, nanowhiskers, irregular shapes, etc. The sizes (e.g., diameter, length, width, characteristic length, aspect ratio) of the thermally conductive ceramic materials can also be in any suitable range, from nanometer range to micrometer range. For example, in various aspects, the thermally conductive ceramic materials can include or consist of particles having an aspect ratio (e.g., length:width) greater than about 500:1, about 400:1, about 300:1, about 200:1, about 100:1, about 50:1. By particular example, in certain aspects, the thermally conductive ceramic materials can include boron nitride nanotubes having an aspect ratio of about 500:1. For example, the thermally conductive ceramic materials can include or consist of particles having an aspect ratio less than about 500:1, about 400:1, about 300:1, about 200:1, about 100:1, about 50:1. For example, the thermally conductive ceramic materials can include or consist of particles having an high aspect ratio in combination with particles having a low aspect ratio or an aspect ratio substantially equals to 1:1. In addition, the coating slurry of the first material 117 can also include additives and surfactants to improve the EPD process and/or the coating quality.

The size and/or the concentration (e.g., volume percentage) of the ceramic materials in the coating slurry of the first material 117 can be tuned to increase the thermal conductivity of the first material 117 or control the morphology of the coating. For example, suitable solvent, surfactants, and/or additives can optionally be used Depending on the chemistry of the first material 117, preparing the electrodes for EPD at step 711 can comprise submerging the conductive element 210 to be coated as one of the electrodes (e.g., anode or cathode) in the slurry of the first material 17, and likewise submerging a counter electrode to arrange a complete electrical circuit. In certain aspects, the preparation of step 711 can include applying one or more masks (e.g., masking tape, not shown) on the conductive element 10 to be coated before submerging the conductive element 210 to be coated into the coating slurry. For example, before submerging the conductive element 210 into the coating slurry of the first material 117, if only portions of the surfaces 212 are to be coated, one or more masks can be applied to the conductive element 210 to cover the surfaces 212 or portions of surfaces 212 that are not to be coated, such that these un-coated surfaces 212 are not in contact with the coating slurry of first material 117. As will be appreciated, a conformal and uniform deposition can be achieved by suitable design of the deposition electrode geometry to control the electrical field for complex geometry deposition. In certain aspects, the preparation of step 711 can also include any suitable cleaning processes to clean the conductive element 210 to be coated or applying a suitable pre-coating (not shown), such as a conversion coating, to the conductive element 210 to be coated.

The EPD process at step 712 generally includes applying direct electrical current through the slurry of first material 17 using electrodes (not shown). Parameters that affect the EPD process can be controlled to achieve desired qualities for the first layer 18 of first material 117. These parameters can include, for example, applied voltage, temperature, coating time, deposition rate, etc. These parameters can affect the deposition kinetics to change the quality or characteristics of the deposition (e.g., thickness, morphology, uniformity, surface coverage, etc.) of first material 117. In certain aspects, these parameters can be tuned or adjusted to align the thermally conductive ceramic materials in the slurry of first material 117. For example, in a non-limiting aspect, the first material 117 can comprise a thermally conductive ceramic material having a high aspect ratio (e.g., nanowire, nanotube, nanofiber) and can be aligned such that the axial direction (e.g., along the length) of the thermally conductive ceramic particles are aligned substantially perpendicular to the surface 212 of the conductive element 210.

The method continues by applying the second material 119 as a second layer 120 on the deposited first layer 118 at step 722. In an aspect, a conventional VPI technique can be used to apply the second layer 120. For example, the conductive element 210 having the first layer 118 applied thereon can be completely submerged in a vessel (not shown) containing the second material 119. Once submerged, a predetermined combination of dry and wet vacuum or pressure cycles can be applied at predetermined temperatures to apply the second material 119 as a second layer 120 over the first layer 118. Typically, the vacuum level is kept below the second material 119 boiling point at room temperature, and the pressure level in pounds per square inch (psi) can typically range from 15 psi to 90 psi. However, aspects are not limited to a VPI process to apply the second layer 120 of the second material 119, and other deposition methods can be used without departing from the scope of the disclosure herein. In various non-limiting aspects, other conventional impregnation process types can be employed, including for example conventional dip coating techniques, which simply immerse the object to be coated into the second material 119 for a predetermined period, and then slowly extract the object.

After the second layer 120 is applied, a post-processing of the conductive element 110 can proceed generally at step 706. For example, the conductive element can be rinsed at step 730. In certain aspects, if one or more masks (e.g., masking tape) were applied to the coated elements, the masks can be removed as part of step 730.

A heat treatment or other suitable curing step can then be applied to the conductive element 210 at 733. The curing step 733 causes the second material 119 to penetrate and/or infuse the deposited first layer 118 to define the insulative coating 115 on the coated portion of the conductive element 210. The curing step 733 can crosslink the deposited polymers to harden the deposited first material 117 and second material 119 and arrange a smooth, continuous, and less porous insulative coating 115. The curing step 733 can include any suitable treatments by heat, ultraviolet (UV) light, infrared (IR) light, and/or electron beam energy to crosslink the deposited polymers and polymer precursors to form a continuous, insulative coating 115 on the conductive element 210. Additionally, the curing step 733 can substantially reduce or eliminate the gaps, voids, and/or factures in the insulative coating 115. Thus, according to an aspect, a conductive element having an insulative coating 115 suitable for use in any electrical machine or device is provided.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The features disclosed in the foregoing description, in the following claims and/or in the accompanying drawings can, both separately and in any combination thereof, be material for realising the invention in diverse forms thereof.

A method of manufacturing an insulated conductive component having a conductive element, the method comprising: applying a first material comprising a thermally conductive ceramic material on at least a portion of the electrically conductive element to form a first layer; applying a second material comprising a polymeric resin onto at least a portion of second material to define a second layer; and curing the conductive element to infuse the second material into the first material to define an electrically insulative, thermally conductive coating on the portion of the electrically conductive element The method of the preceding clause, wherein the coating electrically insulates the electrically conductive element, and wherein the thermally conductive ceramic material defines continuous thermal paths across a thickness of the coating.

The method of any of the preceding clauses, wherein a coefficient of thermal expansion (CTE) of the second material is greater than a CTE of the first material.

The method of any of the preceding clauses, wherein a predetermined amount of the second material is present in the coating to provide a predetermined CTE of the insulative coating.

The method of any of the preceding clauses, wherein a difference between the CTE of the coating and a CTE of the conductive element is less than a difference between the CTE of the first layer and the CTE of the conductive element.

The method of any of the preceding clauses, wherein the insulative coating comprises between about 30% and 50% by volume of the second material.

The method of any of the preceding clauses, wherein the second material additionally comprises a reactive element.

The method of any of the preceding clauses, wherein the second material comprises at least one of liquid crystal polymers, thermal plastics, organic monomers, and oligomers.

The method of any of the preceding clauses, wherein the second material comprises a polymeric thermoset resin.

The method of any of the preceding clauses, wherein the second material comprises an epoxy.

The method of any of the preceding clauses, wherein the second material comprises silicon.

The method of any of the preceding clauses, wherein the first material comprises at least one of aluminum nitride (AlN), boron nitride (BN), aluminum silicate, and Alumina.

The method of any of the preceding clauses, wherein the thermally conductive ceramic material comprises thermally conductive nanotubes.

The method of any of the preceding clauses, wherein the first layer is deposited via an electrophoretic deposition process.

The method of any of the preceding clauses, wherein the second layer is deposited via a vacuum pressure impregnation process.

The method of any of the preceding clauses, wherein the second layer is deposited via a dip coating process.

The method of any of the preceding clauses, wherein the coating defines a homogenous structure.

The method of any of the preceding clauses, wherein the coating defines a conformal coating.

The method of any of the preceding clauses, wherein curing includes heating by one of ultraviolet light, infrared light, chemical, and electron beam energy.

The method of any of the preceding clauses, wherein the electrically conductive element comprises one of copper, aluminum, and steel.

What is claimed is:

1. A method of manufacturing an insulated conductive component having an electrically conductive element, the method comprising:

applying a first material comprising a thermally conductive ceramic material on at least a portion of the electrically conductive element to form a first layer;

applying a second material comprising a polymeric resin onto at least a portion of the first layer to define a second layer; and curing the conductive element to infuse the second material into the first material to define an electrically insulative, thermally conductive coating on the portion of the electrically conductive element.

2. The method of claim 1 wherein the coating electrically insulates the electrically conductive element, and wherein the thermally conductive ceramic material defines continuous thermal paths across a thickness of the coating.

3. The method of claim 2, wherein a coefficient of thermal expansion (CTE) of the second material is greater than a CTE of the first material.

4. The method of claim 3, wherein a predetermined amount of the second material is present in the coating to provide a predetermined CTE of the coating.

5. The method of claim 3, wherein a difference between the CTE of the coating and a CTE of the conductive element is less than a difference between the CTE of the first layer and the CTE of the conductive element.

6. The method of claim 4, wherein the coating comprises between about 30% and 50% of the second material by volume.

7. The method of claim 6, wherein the second material additionally comprises a reactive element.

8. The method of claim 1, wherein the second material comprises at least one of liquid crystal polymers, thermal plastics, organic monomers, and oligomers.

9. The method of claim 1, wherein the second material comprises a polymeric thermoset resin.

10. The method of claim 1, wherein the second material comprises an epoxy.

11. The method of claim 1, wherein the second material comprises silicon.

12. The method of claim 1, wherein the first material comprises at least one of aluminum nitride (AlN), boron nitride (BN), aluminum silicate, and Alumina.

13. The method of claim 1, wherein the thermally conductive ceramic material comprises thermally conductive nanotubes.

14. The method of claim 1, wherein the first layer is deposited via an electrophoretic deposition process.

15. The method of claim 1, wherein the second layer is deposited via a vacuum pressure impregnation process.

16. The method of claim 1, wherein the second layer is deposited via a dip coating process.

17. The method of claim 1, wherein the coating defines a homogenous structure.

18. The method of claim 1, wherein the coating defines a conformal coating.

19. The method of claim 1, wherein curing includes heating by one of ultraviolet light, infrared light, chemical, and electron beam energy.

20. The method of claim 1, wherein the curing arranges the thermally conductive ceramic material and the second material within a polymer matrix.

* * * * *